United States Patent
Albero et al.

(10) Patent No.: US 12,518,056 B2
(45) Date of Patent: Jan. 6, 2026

(54) SYSTEM FOR DETECTION AND MITIGATION OF UNAUTHORIZED REPRODUCTION OF SENSITIVE ELECTRONIC DATA

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 194 days.

(21) Appl. No.: 18/232,563

(22) Filed: Aug. 10, 2023

(65) Prior Publication Data
US 2025/0053684 A1    Feb. 13, 2025

(51) Int. Cl.
G06F 21/00 (2013.01)
G06F 21/62 (2013.01)
G06F 21/84 (2013.01)

(52) U.S. Cl.
CPC .......... G06F 21/6254 (2013.01); G06F 21/84 (2013.01)

(58) Field of Classification Search
CPC ............................. G06F 21/6254; G06F 21/84
See application file for complete search history.

(56) References Cited

U.S. PATENT DOCUMENTS

| | | |
|---|---|---|
| 6,496,591 B1 * | 12/2002 | Rhoads ................ H04N 9/8042 386/328 |
| 8,194,646 B2 | 6/2012 | Elliott |
| 8,316,237 B1 | 11/2012 | Felsher |
| 8,444,181 B2 | 5/2013 | Wicker |
| 8,543,842 B2 | 9/2013 | Ginter |
| 9,473,522 B1 | 10/2016 | Kotler |
| 9,536,097 B2 | 1/2017 | Anderson |
| 9,734,169 B2 | 8/2017 | Redlich |
| 9,820,146 B2 | 11/2017 | Gross |
| 9,913,139 B2 | 3/2018 | Gross |
| 10,382,095 B2 | 8/2019 | Gross |
| 10,838,758 B2 | 11/2020 | Lee |
| 10,979,449 B2 | 4/2021 | Humphries |
| 11,463,264 B2 | 10/2022 | Ngo |
| 11,546,448 B2 | 1/2023 | Entelis |

(Continued)

FOREIGN PATENT DOCUMENTS

WO    WO-2023235519 A1 * 12/2023 ......... G06F 21/6254

*Primary Examiner* — Ghazal B Shehni

(74) *Attorney, Agent, or Firm* — Moore & Van Allen PLLC; Nicholas C. Russell

(57) ABSTRACT

A system is provided for detection and mitigation of unauthorized reproduction of sensitive electronic data. In particular, the system may comprise a networked environment with various computing devices that may be used to store, process, and/or transfer sensitive electronic data. When a user accesses the sensitive data, the contents of the data may be presented as a series of micro dots or pixels. The system may be configured to display rapidly change at least a portion of the micro dots or pixels at a high frequency, such that a snapshot of the sensitive data taken at a singular point in time will not be able to capture all of the data needed to make the data readable to the user. In this way, the system may be able to prevent the unauthorized reproduction of sensitive data within the network environment.

17 Claims, 6 Drawing Sheets

(56) References Cited

U.S. PATENT DOCUMENTS

| | | | |
|---|---|---|---|
| 11,722,502 B1 | 8/2023 | Comeaux | |
| 11,831,624 B2 | 11/2023 | Verzun | |
| 11,864,051 B2 | 1/2024 | Fitzgerald | |
| 2007/0053513 A1 | 3/2007 | Hoffberg | |
| 2013/0238901 A1* | 9/2013 | Wise | H04L 63/102 |
| | | | 713/168 |
| 2014/0037090 A1* | 2/2014 | Nicholls | H04N 21/4405 |
| | | | 380/201 |
| 2018/0049043 A1 | 2/2018 | Hoffberg | |
| 2018/0336209 A1* | 11/2018 | Burshteyn | H04L 9/0631 |
| 2019/0089720 A1 | 3/2019 | Aditham | |
| 2020/0110887 A1* | 4/2020 | Kumar | H04L 9/083 |
| 2020/0389495 A1 | 12/2020 | Crabtree | |
| 2021/0021603 A1* | 1/2021 | Gibbons | G06F 16/221 |
| 2021/0026982 A1 | 1/2021 | Amarendran | |

* cited by examiner

SYSTEM FOR DETECTION AND MITIGATION OF UNAUTHORIZED REPRODUCTION OF SENSITIVE ELECTRONIC DATA

TECHNOLOGICAL FIELD

Example embodiments of the present disclosure relate to a system for detection and mitigation of unauthorized reproduction of sensitive electronic data.

BACKGROUND

There is a need for a way to prevent unauthorized copying of electronic data.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for detection and mitigation of unauthorized reproduction of sensitive electronic data. In particular, the system may comprise a networked environment with various computing devices that may be used to store, process, and/or transfer sensitive electronic data. When a user accesses the sensitive data, the contents of the data may be presented as a series of micro dots or pixels. The system may be configured to display rapidly change at least a portion of the micro dots or pixels at a high frequency, such that a snapshot of the sensitive data taken at a singular point in time will not be able to capture all of the data needed to make the data readable to the user. In some embodiments, the sensitive data may further comprise an embedded micro-tag that may serve as an indicator of the origin of the data, the last user to access the data, the computing devices from and to which the data was transferred and/or received, and/or the like. In this way, the system may be able to prevent the unauthorized reproduction of sensitive data within the network environment.

Accordingly, embodiments of the present disclosure provide a system for detection and mitigation of unauthorized reproduction of sensitive electronic data, the system comprising a processing device; a non-transitory storage device containing instructions when executed by the processing device, causes the processing device to perform the steps of receiving a request from a user computing device to access a data file containing sensitive information; generating a reference frame comprising a matrix of pixels in a reference configuration for displaying contents of the data file; initiating an obfuscation process for obfuscating the sensitive information in the data file, the obfuscation process comprising generating a first frame, wherein the first frame comprises a matrix of pixels for displaying a first altered configuration of the data file, wherein attributes of at least a portion of the pixels within the first frame are altered with respect to the reference frame; generating a second frame, wherein the second frame comprises a matrix of pixels for displaying a second altered configuration of the data file, wherein attributes of at least a portion of the pixels within the second frame are altered with respect to the reference frame and the first frame; and presenting the first frame on a display device of the user computing device, and subsequently presenting the second frame on the display device after a designated interval between the second frame and the first frame.

In some embodiments, the instructions further cause the processing device to perform the steps of generating a third frame, wherein the third frame comprises a matrix of pixels for displaying a third altered configuration of the data file, wherein attributes of at least a portion of the pixels within the third frame are altered with respect to the reference frame, the first frame, and the second frame; and presenting the third frame on the display device after the second frame.

In some embodiments, the third frame is presented after the second frame based on a second designated interval between the third frame and the second frame, wherein the second designated interval is different from the designated interval between the second frame and the first frame.

In some embodiments, the attributes of the pixels of the first frame and the second frame comprise saturation, hue, and brightness.

In some embodiments, the obfuscation process further comprises analyzing the first frame using a machine learning algorithm configured to detect whether information in the first frame is decipherable; and selecting to alter the at least a portion of the pixels within the first such that the machine learning algorithm detects that the information in the first frame is undecipherable.

In some embodiments, at least one pixel that was altered in the first frame is reverted to its reference configuration in the second frame.

In some embodiments, the data file is one of a document file, image file, or video file.

Embodiments of the present disclosure also provide a computer program product for detection and mitigation of unauthorized reproduction of sensitive electronic data, the computer program product comprising a non-transitory computer-readable medium comprising code causing an apparatus to perform the steps of receiving a request from a user computing device to access a data file containing sensitive information; generating a reference frame comprising a matrix of pixels in a reference configuration for displaying contents of the data file; initiating an obfuscation process for obfuscating the sensitive information in the data file, the obfuscation process comprising generating a first frame, wherein the first frame comprises a matrix of pixels for displaying a first altered configuration of the data file, wherein attributes of at least a portion of the pixels within the first frame are altered with respect to the reference frame; generating a second frame, wherein the second frame comprises a matrix of pixels for displaying a second altered configuration of the data file, wherein attributes of at least a portion of the pixels within the second frame are altered with respect to the reference frame and the first frame; and presenting the first frame on a display device of the user computing device, and subsequently presenting the second frame on the display device after a designated interval between the second frame and the first frame.

In some embodiments, the code further causes the apparatus to perform the steps of generating a third frame, wherein the third frame comprises a matrix of pixels for displaying a third altered configuration of the data file, wherein attributes of at least a portion of the pixels within the third frame are altered with respect to the reference frame, the first frame, and the second frame; and presenting the third frame on the display device after the second frame.

In some embodiments, the third frame is presented after the second frame based on a second designated interval between the third frame and the second frame, wherein the second designated interval is different from the designated interval between the second frame and the first frame.

In some embodiments, the attributes of the pixels of the first frame and the second frame comprise saturation, hue, and brightness.

In some embodiments, the obfuscation process further comprises analyzing the first frame using a machine learning algorithm configured to detect whether information in the first frame is decipherable; and selecting to alter the at least a portion of the pixels within the first such that the machine learning algorithm detects that the information in the first frame is undecipherable.

In some embodiments, at least one pixel that was altered in the first frame is reverted to its reference configuration in the second frame.

Embodiments of the present disclosure also provide a computer-implemented method for detection and mitigation of unauthorized reproduction of sensitive electronic data, the computer-implemented method comprising receiving a request from a user computing device to access a data file containing sensitive information; generating a reference frame comprising a matrix of pixels in a reference configuration for displaying contents of the data file; initiating an obfuscation process for obfuscating the sensitive information in the data file, the obfuscation process comprising generating a first frame, wherein the first frame comprises a matrix of pixels for displaying a first altered configuration of the data file, wherein attributes of at least a portion of the pixels within the first frame are altered with respect to the reference frame; generating a second frame, wherein the second frame comprises a matrix of pixels for displaying a second altered configuration of the data file, wherein attributes of at least a portion of the pixels within the second frame are altered with respect to the reference frame and the first frame; and presenting the first frame on a display device of the user computing device, and subsequently presenting the second frame on the display device after a designated interval between the second frame and the first frame.

In some embodiments, the method further comprises generating a third frame, wherein the third frame comprises a matrix of pixels for displaying a third altered configuration of the data file, wherein attributes of at least a portion of the pixels within the third frame are altered with respect to the reference frame, the first frame, and the second frame; and presenting the third frame on the display device after the second frame.

In some embodiments, the third frame is presented after the second frame based on a second designated interval between the third frame and the second frame, wherein the second designated interval is different from the designated interval between the second frame and the first frame.

In some embodiments, the attributes of the pixels of the first frame and the second frame comprise saturation, hue, and brightness.

In some embodiments, the obfuscation process further comprises analyzing the first frame using a machine learning algorithm configured to detect whether information in the first frame is decipherable; and selecting to alter the at least a portion of the pixels within the first such that the machine learning algorithm detects that the information in the first frame is undecipherable.

In some embodiments, at least one pixel that was altered in the first frame is reverted to its reference configuration in the second frame.

In some embodiments, the data file is one of a document file, image file, or video file.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
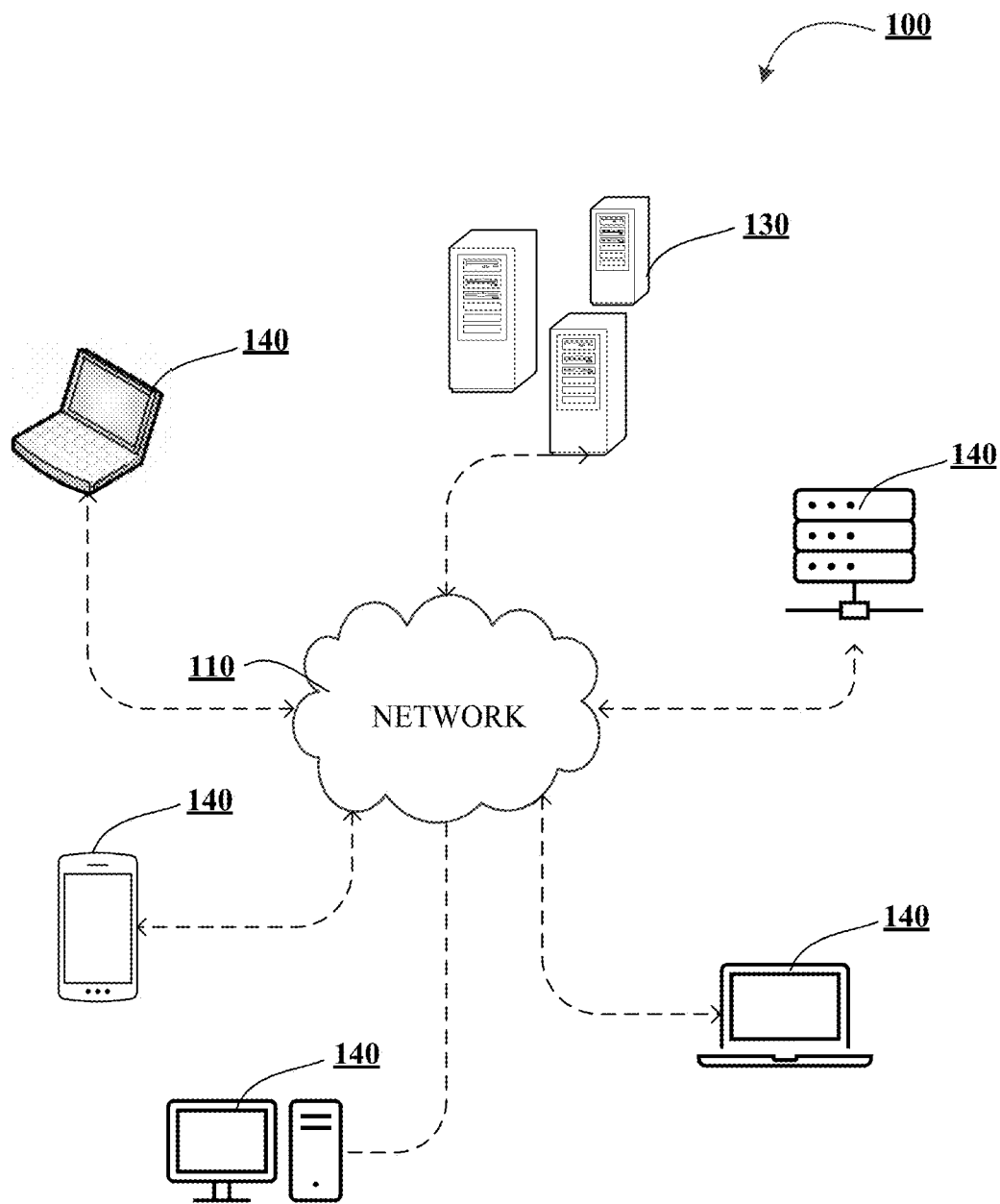
Figure 1B:
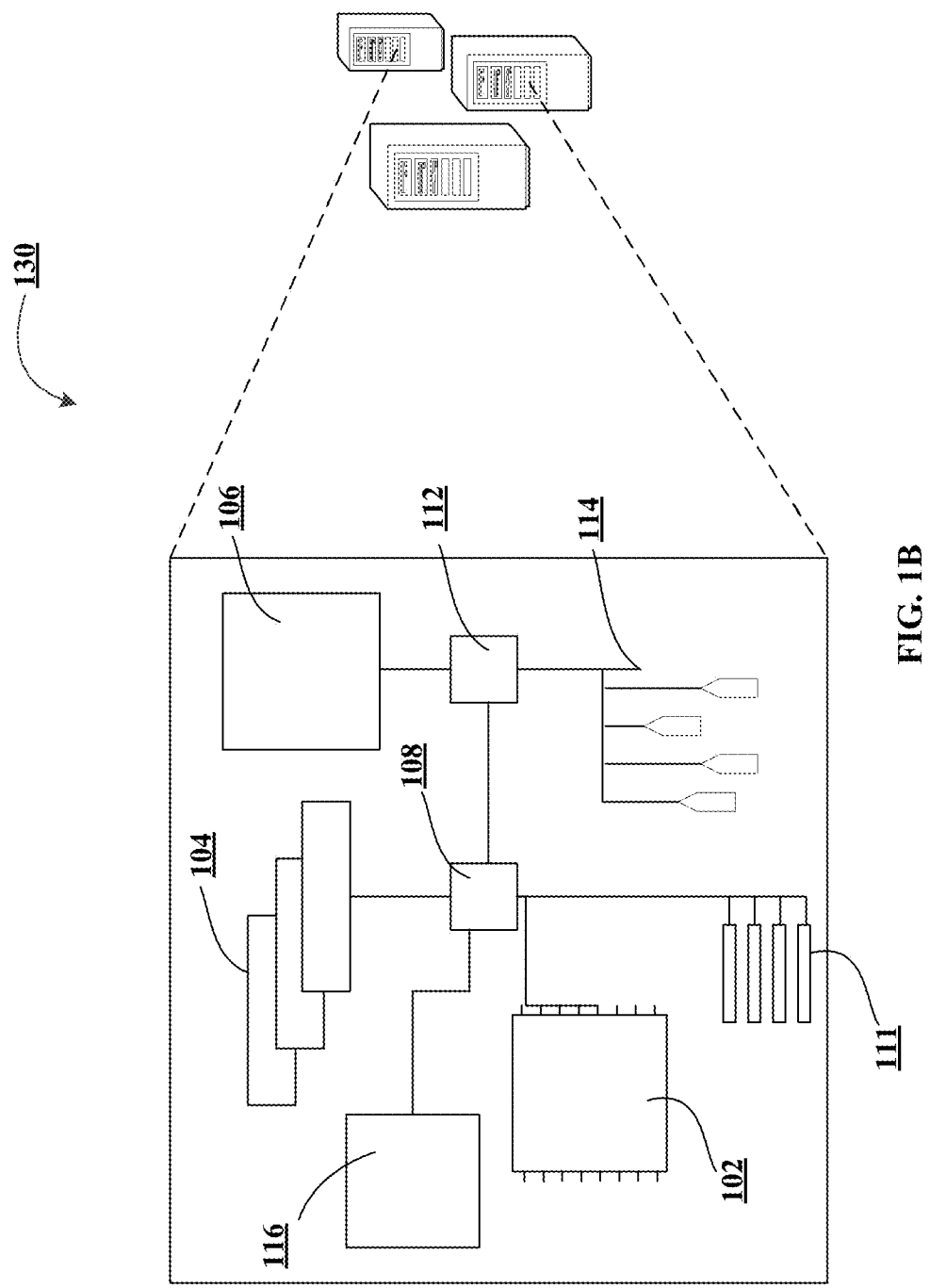
Figure 1C:
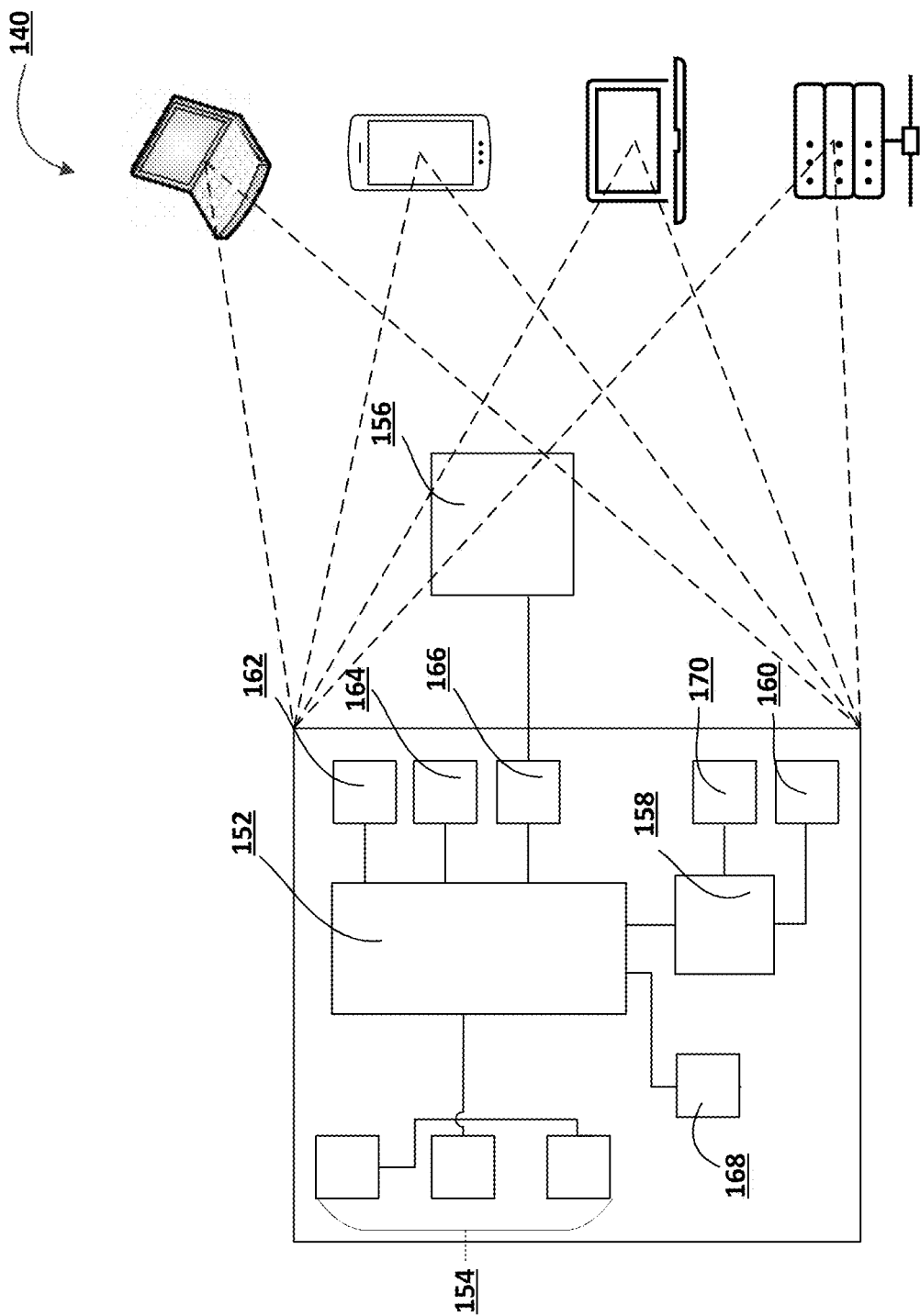
Figure 2:
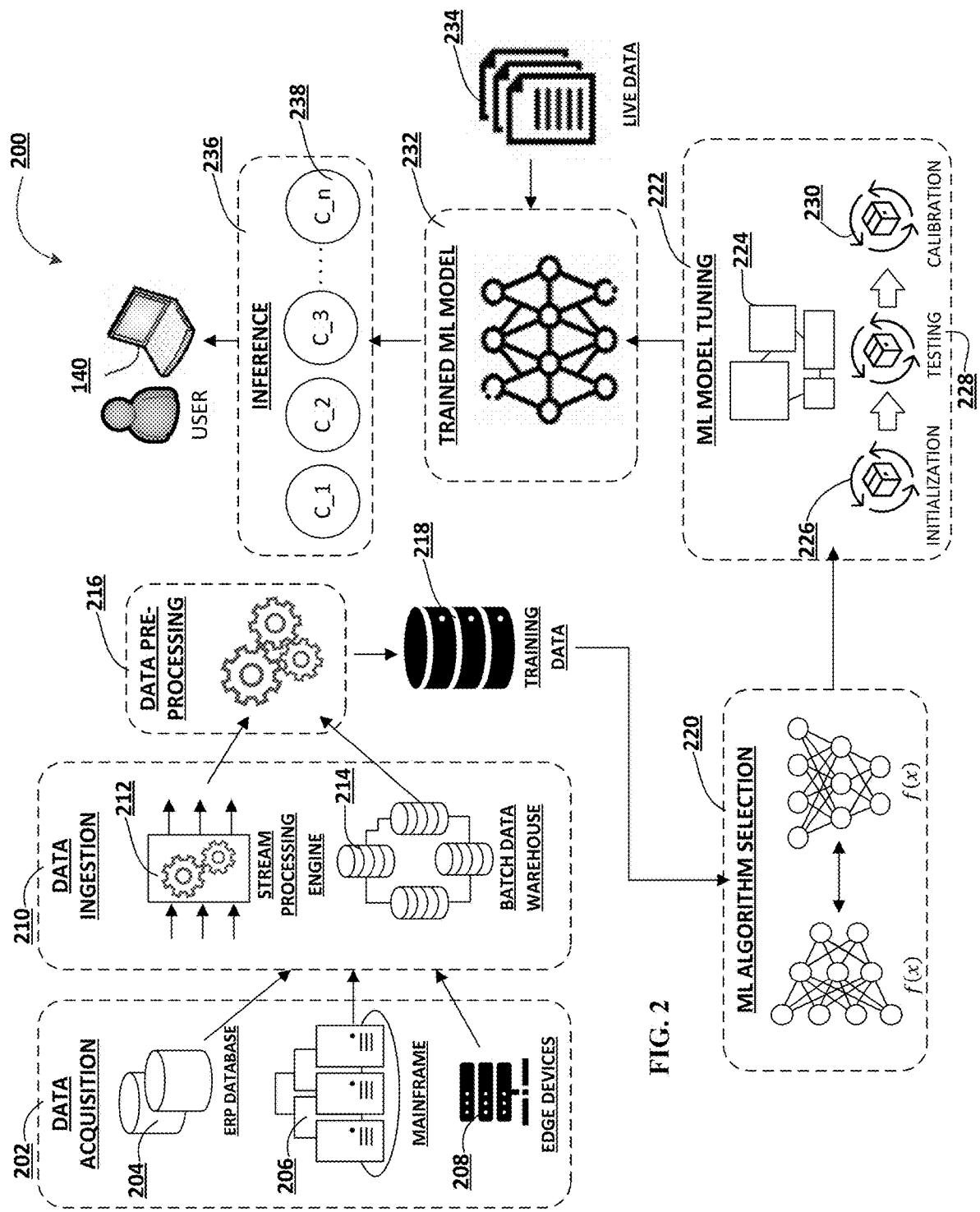
Figure 3:
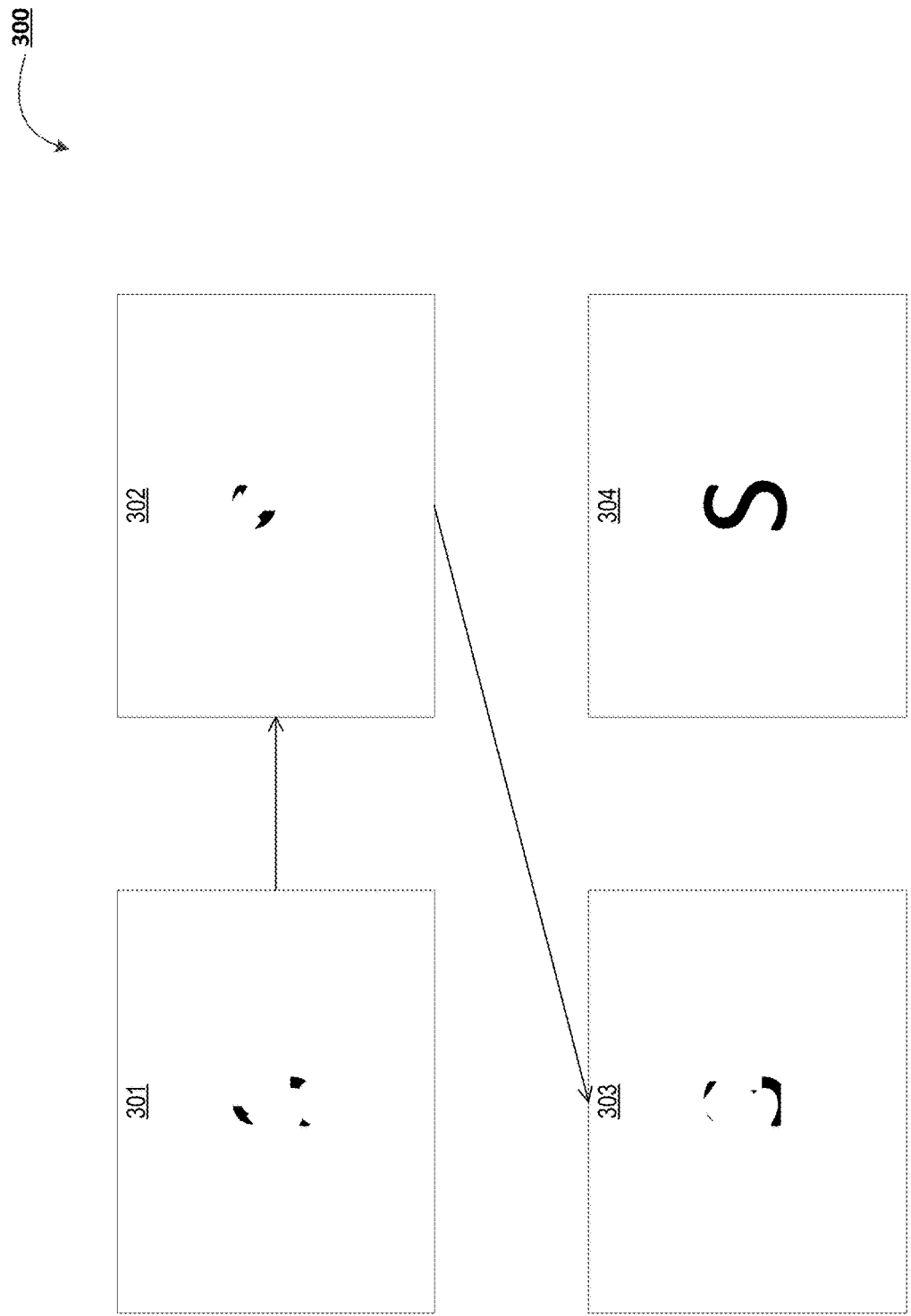
Figure 4:
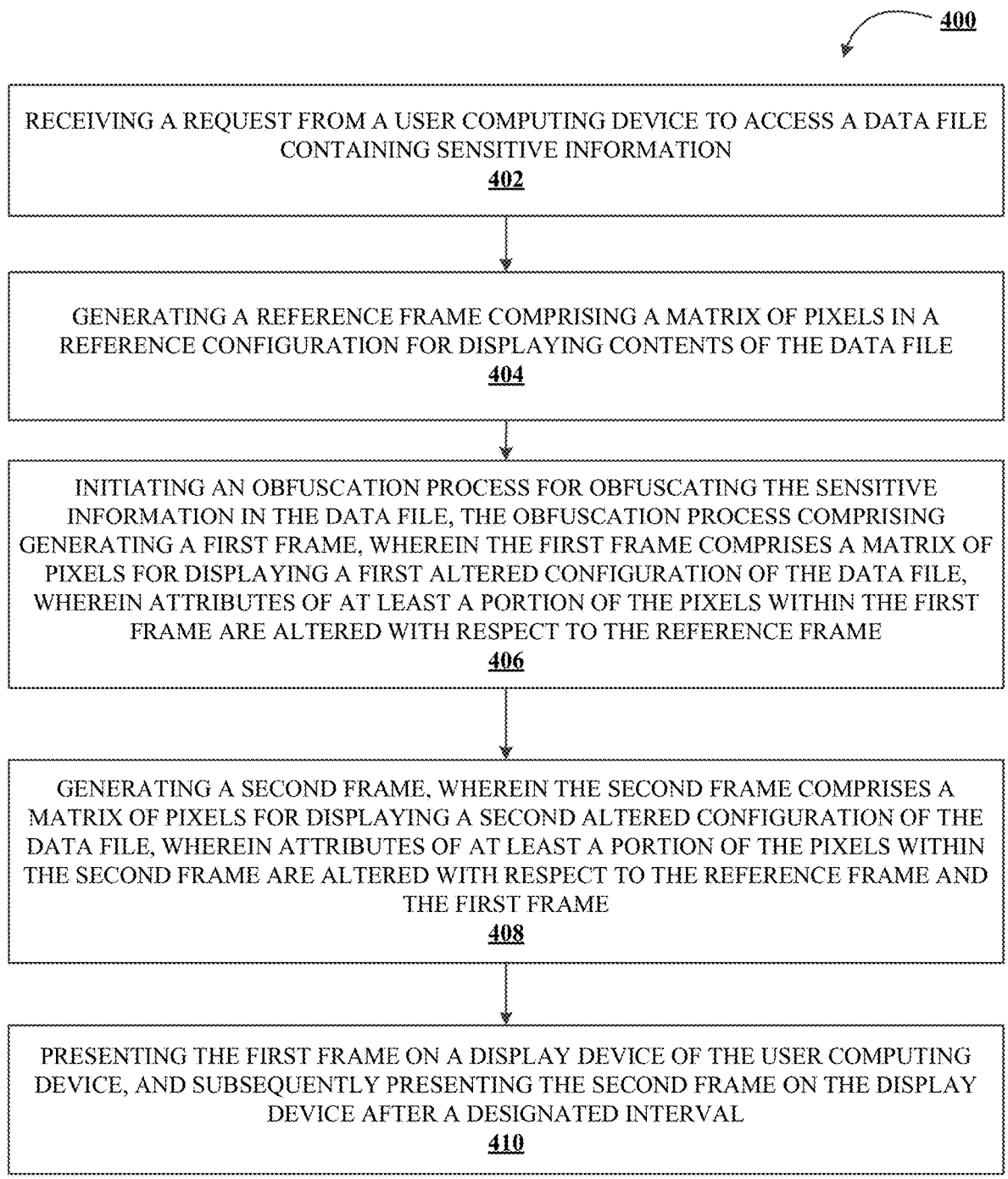

FIGS. 1A-1C illustrates technical components of an exemplary distributed computing for detection and mitigation of unauthorized reproduction of sensitive electronic data, in accordance with an embodiment of the disclosure;

FIG. 2 illustrates an exemplary machine learning ("ML") subsystem architecture, in accordance with an embodiment of the disclosure;

FIG. 3 illustrates an exemplary series of frames generated by the system when displaying a data file containing sensitive information, in accordance with an embodiment of the disclosure; and FIG. 4 illustrates a method for detection and mitigation of unauthorized reproduction of sensitive electronic data, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like. In yet other embodiments, the resources may include real-world goods or commodities that may be acquired and/or exchanged by a user.

An entity's networked computing environment may comprise various computing devices that may store, access, process, transmit, and/or receive sensitive data files, where the data files may include document files, image files, video files, and/or the like. In such scenarios, there is a possibility that a user may access, copy, and/or transfer the sensitive data to unauthorized parties and/or devices. For instance, in some cases, the user may perform a copy process and attempt to transmit the copied data to an unauthorized computing device. In other cases, the user may attempt to attempt a visual extraction of the information within the data file, such as by printing the data file, capturing a screenshot of a portion of the data file, capturing the data file using a camera, and/or the like. Accordingly, there is a need for a secure way to the prevent users from exfiltrating or performing unauthorized copying of the sensitive data.

To address the above concerns among others, the system described herein provides a way to detect and mitigate unauthorized reproduction of sensitive electronic data. In this regard, a computing device within a network environment may have a sensitive data file stored thereon. The sensitive data file may be, for instance, a document file containing classified or confidential information, an image file containing a photograph of critical system architectures, an e-mail message file containing confidential internal correspondence, and/or the like. Upon detecting a request from a user computing device to access the sensitive data file (e.g., the user has attempted to open the data file), the system may present the sensitive data by rendering an array of microdots or pixels configured to display the sensitive data. For example, if the data file is a document file, the system may present the document file in a rectangular matrix of pixels (e.g., within a designated displayable area within an application window, where the application may be a document viewer application). The matrix of pixels may be expressed as a series of rows and columns of pixels, where the matrix has a width (e.g., 1920 pixels) and a height (e.g., 1080 pixels).

The system may, at a designated interval, change at least a portion of the pixels within the pixel array, where the change may include adjusting one or more attributes of a set of selected pixels from what the attributes should be when the original data file is displayed. Examples of such attributes may include pixel intensity or brightness, hue, saturation, and or the like. For instance, if an original pixel configuration for a particular pixel (e.g., how the pixel should appear when viewing the original data file) specifies that the pixel is black in color (e.g., a pixel that is part of a letter in a written sentence in a document file), an altered pixel configuration may change the pixel to be pink or white. In this way, the pixels to be changed may be selected by the system such that when the selected pixels are changed, the resulting image (which may also be referred to herein as a "frame") may be unreadable or undecipherable at a given instantaneous moment. Continuing the example, if the data file is a document file, a set of pixels may be changed such that the sentences within a particular frame may be illegible. In this way, the system may create a series of frames based on the original data file, where no single frame contains the pixels needed to understand or decipher the information contained within the data file. As such, if a user attempts to create an unauthorized reproduction of the data file through a still image capture such as a print job or photographic capture using a camera, the still image capture may appear garbled and be illegible because it captures only a single frame generated by the system. However, the system may adjust the interval of the changes to the pixels such that when the series of frames are viewed in real time by the user, the persistence of vision of the user's eye may cause the user to perceive each frame as being displayed for longer than it is actually displayed by the hardware of the system.

For example, if a first frame is displayed to the user for 10 ms, and a second frame is subsequently displayed to the user for 10 ms, the image perceived by the user of the two frames may be a composite image (e.g., a combination of the first frame and the second frame). In this way, even though neither the first frame nor the second frame alone contains the pixel data needed to display the information in the data file, when the frames are displayed in rapid succession, the user may be able to perceive the shapes and colors necessary to view and understand the information within the data file. In this regard, the system may select the interval (or "refresh time") at which the frames are generated based on the persistence of vision of the user's eye (e.g., an interval of between 2 and 100 ms, or 10 to 500 frames displayed per second). In one embodiment, the interval may be between 10 and 15 ms. In another embodiment, the interval may be between 20 to 40 ms.

Accordingly, the system may configure the shifts in the pixels such that the pixels of the original data file appear for a long enough time period and frequently enough to maintain the visibility of the original data file to the user's unaided eye. In this regard, the system may track the period of time that elapses once a particular pixel changes from the original pixel configuration (e.g., the pixel that would have been displayed in the original data file) to an altered pixel configuration. The system may set an upper threshold, where the threshold is the maximum amount of time that may elapse for a particular pixel to remain in an altered pixel configuration. When the system detects that the period of time is approaching or has exceeded the threshold, the system may set the pixel to return to its original pixel configuration. In this way, the system may maintain the readability of the data file while ensuring that image captures of the data file will remain unreadable.

In some embodiments, the system may dynamically adjust the refresh times of the pixels on a per-refresh basis. For instance, for a first pixel refresh, the refresh time may be 11 ms, and for a second refresh, the refresh time may be 22 ms. In particular, the system may adjust the refresh times such that the data file remains visible to the user but may cause artifacts to appear when a user attempts to record a video file of the data file that is displayed by the system (e.g., on a monitor).

In some embodiments, the sensitive data file may further comprise a microtag that may be embedded therein. For instance, in some embodiments, the microtag may be a steganographic digital watermark that may be invisible or imperceptible to the human eye, such as an image that may be displayed within a pixel of the displayed or printed data file. If the data file is an image file, the microtag may be a symbol (e.g., a hat, a bird, and/or the like) that may be displayed in a designated pixel at a designated frame or time. The location and/or content of the microtag may change over time. For example, the microtag may be a first symbol displayed within a first pixel at a first time, and a second symbol displayed within a second pixel at a second time. Furthermore, the system may maintain a log of which symbols are displayed in which pixels at particular times. Accordingly, if an unauthorized image of the displayed data file is captured by the user, the system may be able to determine the exact time at which the unauthorized image was generated. In turn, by determining which users and/or devices were accessing the data file at the time the unauthorized image was generated, the system may be used to determine which user or device was used to generate the unauthorized image.

An exemplary embodiment is described below for illustrative purposes only and should not be construed as restricting the scope of the disclosure provided herein. In one embodiment, a user may use a user computing device to access an image file containing confidential information (e.g., by opening the image file in an image viewer application). The system may display (e.g., on a monitor or screen of the user computing device) a first frame of the image file, where a first set of pixels of the first frame have been altered from the original configuration. A designated interval after the first frame is displayed, the system may display a second frame of the image file, where a second set of pixels of the second frame have been altered from the original configuration. Accordingly, some of the pixels of the first frame image (e.g., some of the pixels within the first set of pixels) may be reverted back to the original configuration when the second frame is displayed. In this way, if the user attempts to copy the image file through a screen capture (e.g., using the user computing device), the user computing device may only be able to capture a single frame, which does not contain enough of the pixels in the original pixel configuration to decipher the contents of the image file. Furthermore, one or more microtags may be embedded into one or more of the pixels within any given frame, such that if the unauthorized image is captured, the system may be able to determine exactly which user or user computing device has been used to generate the unauthorized image.

The system as described herein provides a number of technological benefits over conventional data file protection systems. In particular, by rapidly altering pixel configurations at designated intervals, the system may maintain readability of data files while simultaneously preventing them from being captured through circuitous methods such as screen captures or photographic captures. Furthermore, through the use of microtags, the system may allow the source of unauthorized reproductions to be identified.

FIGS. 1A-1C illustrate technical components of an exemplary distributed computing environment 100 for the system for detection and mitigation of unauthorized reproduction of sensitive electronic data. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process)

with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates an exemplary series of frames generated by the system when displaying a data file containing sensitive information, in accordance with an embodiment of the disclosure. The frames may be generated based on a user accessing a data file. In the example shown, the data file is a document file containing the letter "S", as shown in reference frame 304, which shows the original configuration of the document file. Accordingly, the system may generate a first frame 301, which shows a first altered configuration of the data file in which at least a portion of the pixels of the original configuration are altered, thereby rendering the first frame 301 illegible in isolation. The system may then generate and present a second frame 302 in place of the first frame 301, which shows a second altered configuration of the data file in which some of the altered pixels of the first configuration are reverted back to their original configuration, and some of the unaltered pixels of the first configuration are altered. The second frame 302 may be displayed at a designated interval after the first frame 301 is stopped from being displayed, such as 10 ms. The system may then generate and present a third frame 303 in place of the second frame 302, which shows a third altered configuration of the data file. Once again, at least a portion of the altered pixels of the second configuration may be reverted back to their original configuration, while at least a portion of the unaltered pixels of the second configuration may be altered. If a user attempts to capture a still image of the display (e.g., a screen capture or photograph), the user may only be able to capture a single frame (e.g., the first frame 301, second frame 302, or third frame 303), which may not be deciphered in isolation. That said, if the first frame 301, second frame 302, and third frame 303, and the like are displayed to the user in rapid succession, the persistence of the user's eye may allow the user to understand and recognize the data file as containing the letter "S" as shown in the reference frame 304. It should be understood that the foregoing example was provided for illustrative purposes only and is not intended to restrict the scope of the disclosure provided herein. For instance, the data file may be, in other embodiments, an image file, written correspondence, presentation file, and/or the like. Furthermore, though three frames 301, 302, 303 are shown in FIG. 3, it should be appreciated by those skilled in the art that it is within the scope of the disclosure for the system to use a fewer or greater number of frames as needed to balance real-time readability of the data file with the desired level of security of each frame rendered by the system.

FIG. 4 illustrates a method 400 for detection and mitigation of unauthorized reproduction of sensitive electronic data, in accordance with an embodiment of the disclosure. As shown in block 402, the method includes receiving a request from a user computing device to access a data file containing sensitive information. The data file may be, for instance, a document file, image file, video file, and/or the like which may contain information that can be visually represented on the display device (e.g., screen) of the user computing device. For instance, if the data file is a document, the contents of the data file may be presented within a document viewer application displayed on the display device of the user computing device. In this regard, the contents of the data file may be presented as a matrix of pixels, where each pixel within the matrix may be configured with the appropriate attributes or parameters (e.g., saturation, hue, brightness, and/or the like) to display the information in the data file. In some cases, the entity that hosts or owns the data file may wish to prevent the unauthorized visual reproduction of the contents of the data file while maintaining its viewability and usability to legitimate users.

Next, as shown in block 404, the method includes generating a reference frame comprising a matrix of pixels in a reference configuration for displaying contents of the data file. In this regard, the "reference configuration" of the pixels may be the configuration of pixels that would have been displayed to the user in the absence the obfuscation processes described herein. In other words, the reference frame may be the visual information that the system seeks to present to the user, taking into account the persistence of the user's vision. Accordingly, the subsequent obfuscated frames may be generated based on the reference frame.

Next, as shown in block 406, the method includes initiating an obfuscation process for obfuscating the sensitive information in the data file. The obfuscation process may include generating a first frame, wherein the first frame comprises a matrix of pixels for displaying a first altered configuration of the data file, wherein attributes of at least a portion of the pixels within the first frame are altered with respect to the reference frame. The pixels to be altered may be selected by the system to disrupt the legibility or decipherability of the contents of the sensitive information as they would appear in the reference frame. In this regard, in some embodiments, the system may use a machine learning algorithm (e.g., a character recognition algorithm, image recognition algorithm, and/or the like) that may be trained to recognize when contents are legible and decipherable and when they are not. Accordingly, when generating the first frame (or any of the subsequent frames), the system may select the pixels to alter along with the attributes or parameters of the selected pixels such that the machine learning algorithm may be unable to read or decipher the contents of the information displayed in the first frame. In other words, when the selected pixels of the first frame are altered, the first frame may be obfuscated or garbled when examined in isolation from the remaining frames.

Next, as shown in block 408, the method includes generating a second frame, wherein the second frame comprises a matrix of pixels for displaying a second altered configuration of the data file, wherein attributes of at least a portion of the pixels within the second frame are altered with respect to the reference frame and the first frame. As was the case with the first frame, the information presented in the second frame may be undecipherable when the second frame is viewed in isolation. In some embodiments, at least a portion of the altered pixels in the first frame may be reverted back to the reference configuration in the second frame. The system may decide which pixels to revert back to the reference configuration based on the threshold time that a particular pixel has spent in an altered configuration, where the threshold time may be set by the system based on the permanence of the user's vision. For instance, the system may determine that more than 15 ms has elapsed since a pixel has been altered from the reference configuration. Upon detecting that such a threshold has elapsed, the system may revert the pixel back to the reference configuration to ensure that the user may continue to view the information in the data file.

Next, as shown in block 410, the method includes presenting the first frame on a display device of the user computing device, and subsequently presenting the second frame on the display device after a designated interval. The designated interval may, for instance, fall within a range of 10 ms to 50 ms, inclusive. The interval may be lengthened or shortened by the system to balance the visual comfort of the user with the demand for computing resources involved in generating the frames. By displaying the first frame, then the second frame, then any subsequent frames in succession based on the designated interval, the system may ensure that the correct pixels may be displayed for a sufficiently long duration for the user to be able to view the information within the data file while also ensuring that any single frame does not contain enough visual data to allow the sensitive information from being deciphered. In some embodiments, the system may dynamically adjust the interval between frames. For instance, in the event that a third frame is displayed after the second frame, the interval between the second and third frame may be different from the interval between the first and the second frame. In this way, the system may further increase the level of protection against unauthorized visual capture of the data file.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for detection and mitigation of unauthorized reproduction of sensitive electronic data, the system comprising:
    a processing device;
    a non-transitory storage device containing instructions when executed by the processing device, causes the processing device to perform the steps of:
        receiving a request from a user computing device to access a data file containing sensitive information;
        generating a reference frame comprising a matrix of pixels in a reference configuration for displaying contents of the data file;
        initiating an obfuscation process for obfuscating the sensitive information in the data file, the obfuscation process comprising:
            generating a first frame, wherein the first frame comprises a matrix of pixels for displaying a first altered configuration of the data file, wherein attributes of at least a portion of pixels within the first frame are altered with respect to the reference frame;
            analyzing the first frame using a machine learning algorithm configured to detect whether information in the first frame is decipherable; and
            selecting to alter the at least a portion of the pixels within the first frame such that the machine learning algorithm detects that the information in the first frame is undecipherable; and
            generating a second frame, wherein the second frame comprises a matrix of pixels for displaying a second altered configuration of the data file, wherein attributes of at least a portion of pixels within the second frame are altered with respect to the reference frame and the first frame; and
        presenting the first frame on a display device of the user computing device, and subsequently presenting the second frame on the display device after a designated interval between the second frame and the first frame.

2. The system of claim 1, wherein the instructions further cause the processing device to perform the steps of:
    generating a third frame, wherein the third frame comprises a matrix of pixels for displaying a third altered configuration of the data file, wherein attributes of at least a portion of the pixels within the third frame are altered with respect to the reference frame, the first frame, and the second frame; and
    presenting the third frame on the display device after the second frame.

3. The system of claim 2, wherein the third frame is presented after the second frame based on a second designated interval between the third frame and the second frame, wherein the second designated interval is different from the designated interval between the second frame and the first frame.

4. The system of claim 1, wherein the attributes of the pixels of the first frame and the second frame comprise saturation, hue, and brightness.

5. The system of claim 1, wherein at least one pixel that was altered in the first frame is reverted to its reference configuration in the second frame.

6. The system of claim 1, wherein the data file is one of a document file, image file, or video file.

7. A computer program product for detection and mitigation of unauthorized reproduction of sensitive electronic data, the computer program product comprising a non-transitory computer-readable medium comprising code causing an apparatus to perform the steps of:
    receiving a request from a user computing device to access a data file containing sensitive information;
    generating a reference frame comprising a matrix of pixels in a reference configuration for displaying contents of the data file;
    initiating an obfuscation process for obfuscating the sensitive information in the data file, the obfuscation process comprising:
        generating a first frame, wherein the first frame comprises a matrix of pixels for displaying a first altered configuration of the data file, wherein attributes of at least a portion of pixels within the first frame are altered with respect to the reference frame;
        analyzing the first frame using a machine learning algorithm configured to detect whether information in the first frame is decipherable; and
        selecting to alter the at least a portion of the pixels within the first frame such that the machine learning algorithm detects that the information in the first frame is undecipherable; and
        generating a second frame, wherein the second frame comprises a matrix of pixels for displaying a second altered configuration of the data file, wherein attributes of at least a portion of the pixels within the second frame are altered with respect to the reference frame and the first frame; and
    presenting the first frame on a display device of the user computing device, and subsequently presenting the second frame on the display device after a designated interval between the second frame and the first frame.

8. The computer program product of claim 7, wherein the code further causes the apparatus to perform the steps of:

generating a third frame, wherein the third frame comprises a matrix of pixels for displaying a third altered configuration of the data file, wherein attributes of at least a portion of the pixels within the third frame are altered with respect to the reference frame, the first frame, and the second frame; and presenting the third frame on the display device after the second frame.

9. The computer program product of claim 8, wherein the third frame is presented after the second frame based on a second designated interval between the third frame and the second frame, wherein the second designated interval is different from the designated interval between the second frame and the first frame.

10. The computer program product of claim 7, wherein the attributes of the pixels of the first frame and the second frame comprise saturation, hue, and brightness.

11. The computer program product of claim 7, wherein at least one pixel that was altered in the first frame is reverted to its reference configuration in the second frame.

12. A computer-implemented method for detection and mitigation of unauthorized reproduction of sensitive electronic data, the computer-implemented method comprising:

receiving a request from a user computing device to access a data file containing sensitive information;

generating a reference frame comprising a matrix of pixels in a reference configuration for displaying contents of the data file;

initiating an obfuscation process for obfuscating the sensitive information in the data file, the obfuscation process comprising:

generating a first frame, wherein the first frame comprises a matrix of pixels for displaying a first altered configuration of the data file, wherein attributes of at least a portion of pixels within the first frame are altered with respect to the reference frame;

analyzing the first frame using a machine learning algorithm configured to detect whether information in the first frame is decipherable; and selecting to alter the at least a portion of the pixels within the first frame such that the machine learning algorithm detects that the information in the first frame is undecipherable; and generating a second frame, wherein the second frame comprises a matrix of pixels for displaying a second altered configuration of the data file, wherein attributes of at least a portion of the pixels within the second frame are altered with respect to the reference frame and the first frame; and presenting the first frame on a display device of the user computing device, and subsequently presenting the second frame on the display device after a designated interval between the second frame and the first frame.

13. The computer-implemented method of claim 12, wherein the method further comprises:

generating a third frame, wherein the third frame comprises a matrix of pixels for displaying a third altered configuration of the data file, wherein attributes of at least a portion of the pixels within the third frame are altered with respect to the reference frame, the first frame, and the second frame; and presenting the third frame on the display device after the second frame.

14. The computer-implemented method of claim 13, wherein the third frame is presented after the second frame based on a second designated interval between the third frame and the second frame, wherein the second designated interval is different from the designated interval between the second frame and the first frame.

15. The computer-implemented method of claim 12, wherein the attributes of the pixels of the first frame and the second frame comprise saturation, hue, and brightness.

16. The computer-implemented method of claim 12, wherein at least one pixel that was altered in the first frame is reverted to its reference configuration in the second frame.

17. The computer-implemented method of claim 12, wherein the data file is one of a document file, image file, or video file.

* * * * *